May 8, 1973 C. F. LOGAN Re. 27,640

INFLATABLE FLOAT BOOM

Original Filed Sept. 6, 1968

INVENTOR.
Campbell F. Logan
BY
George H. Baldwin
ATTORNEY

United States Patent Office

Re. 27,640
Reissued May 8, 1973

27,640

INFLATABLE FLOAT BOOM

Campbell F. Logan, 530 Goodwin St., Jacksonville, Fla. 32204

Original No. 3,494,132, dated Feb. 10, 1970, Ser. No. 757,849, Sept. 6, 1968. Application for reissue Sept. 25, 1970, Ser. No. 75,556

Int. Cl. E02b *15/04*

U.S. Cl. 61—1 F 17 Claims

Matter enclosed in heavy brackets [ ] appears in the original patent but forms no part of this reissue specification; matter printed in italics indicates the additions made by reissue.

ABSTRACT OF THE DISCLOSURE

An inflatable float boom having a pair of elongated selectively inflatable tubes connected throughout their lengths by a joining web and a pair of elongated hollow members filled with particulate solids are disposed within respective tubes, such members being free to fall into the lower side portions of respective tubes. A separate gas valve is connected to each tube so that one tube can be inflated to float the boom on the surface of the liquid and the deflated tube functioning as a depending skirt therefore. A sleeve is provided between the end portions of the tubes to bridge the gap and to surround the releasable connectors therebetween.

BACKGROUND OF THE INVENTION

Field of the invention

This invention relates to float booms and more particularly a float boom which includes a pair of selectively inflatable and deflatable tubes.

Description of the prior art

Various methods and apparatus have been devised to confine floatable material on a liquid surface, including those exemplified by Patent Nos. 2,240,567; 2,682,151; 2,968,928; 3,146,598 and 3,369,664. Most of these patents relate to an inflatable tube with a depending skirt, such tube and skirt forming an opened-bottom enclosed ring into which the floatable material enters and is retained for recovery therefrom to prevent pollution. Problems are encountered when the inflatable tube becomes defective, as by a hole therein, thus causing the tube to collapse and allowing the floatable material to escape from the ring. This invention solves these problems in a novel manner by providing a pair of selectively inflatable tubes whereby the inflated tube functions to float the boom while the deflated tube functions as the depending skirt. If the inflated tube becomes deflated by an opening therein, the deflated tube is inflated and the now deflated tube becomes the depending skirt portion of the boom.

SUMMARY OF THE INVENTION

This invention relates to a float boom for confining material floatable on a liquid surface, such boom employing a first tube means including a first hollow collapsible elongated tube and second tube means including a second hollow collapsible elongated tube disposed alongside the first tube. Joining means impermeable by the floatable material externally connects the tubes along the lengths thereof, and separate means for selectively and separately gas inflating and deflating each of the tubes are provided. The specific gravity of the first tube means and of the second tube means is greater than that of the liquid whereby when the tube of either tube means is deflated that tube means sinks. The gas capacity of each tube alone is sufficient when either one of the tubes is inflated and the other deflated to float the joining means and both of the tube means.

The float boom further includes separate weight means free within respective tubes to fall into the lower inside portion thereof. The weight means *or bouyancy reducing means* each include a hollow member having a small diameter relative to the diameters of the tubes when inflated and particulate solids having a specific gravity greater than the liquid generally filling the member. A sleeve impermeable by the floatable material telescopingly receives therein and bridges between the end portions of each of the tubes and the joining means with the releasable means therewithin.

A general object of the present invention is to provide an improved float boom for confining floatable material on a liquid surface.

A particular object is the provision of a pair of inflatable and deflatable tubes in which either tube functions to float the boom and the other tube functions as the depending skirt for the boom.

Another particular object of the invention is to provide a float boom having freely disposed weight means in each of a pair of tubes which assume appropriate positions therein when either tube is inflated.

A specific object is to provide means for connecting the ends of the boom or of adjacent booms which inhibit the leakage of confined floatable material therethrough.

Other objects include the provision of an improved float boom inexpensive in the manufacture and maintenance thereof and readily manipulated in the repeated installation and use thereof.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENT

Figure 1:
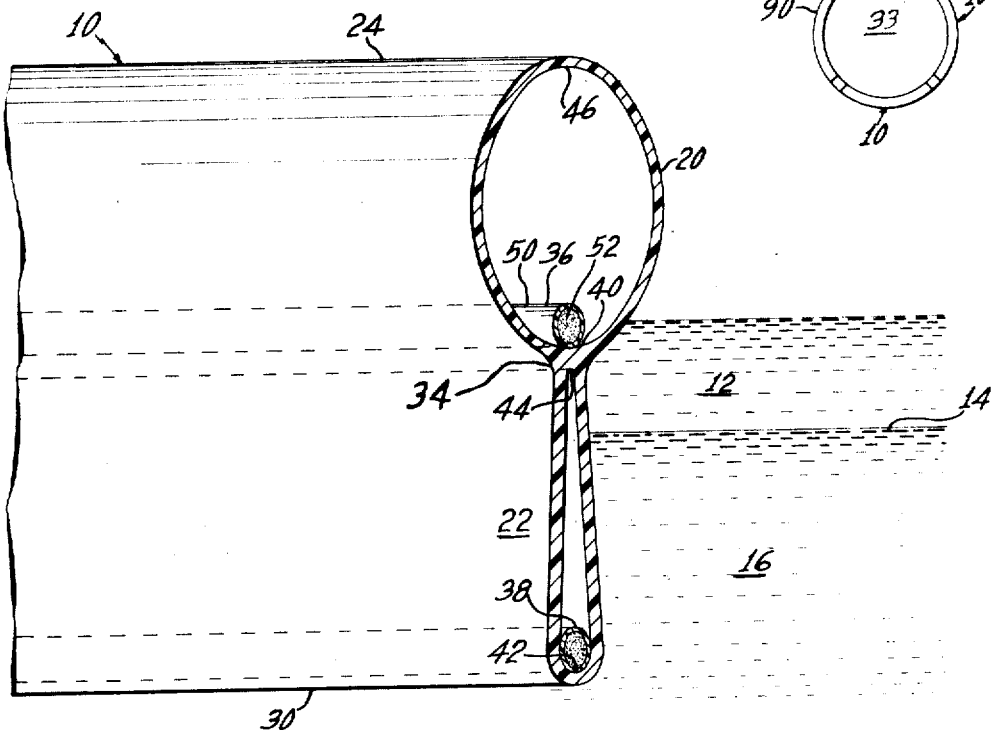
FIG. 1 is an isometric view partly in section of the float boom in accord with this invention, showing the floatable material on a liquid surface.

Referring now more particularly to the drawings, the float boom is designated at 10 in FIG. 1 with the floatable material to be confined being depicted by numeral 12. Material 12 floats on the surface 14 of liquid 16, liquid 16 being a body of water, for example, a lake, river or sea, as well known in the art. Float boom 10 includes a first tube means 20 and a second tube means 22, tube means 20 including a first hollow collapsible elongated tube 24 and means 26 for selectively gas inflating and deflating tube 24. Another means 28 selectively and separately gas inflates and deflates the second hollow collapsible elongated tube 30 of second tube means 22.

Figure 4:
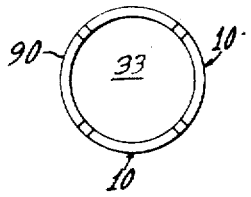
FIG. 4 is a top view depicting one use of the invention wherein a plurality of float booms are connected end to end to form a continuous barrier to confine the floatable material on a liquid surface.

Joining means 34, impermeable by the floatable material 12, externally connects the first tube 24 with the second tube 30 along the length thereof whereby an impermeable floatable material barrier is formed to confine the floatable material within an enclosed space 33, as shown in FIG. 4.

The specific gravity of the first tube means 20 and of the second tube means 22 is greater than the specific gravity of the liquid 16 whereby when the tube of either tube means 20 or 22 is deflated that tube means sinks with tube means 22 being shown in deflated condition and forming a depending skirt for the inflated tube means 20. The gas capacity of each tube alone is sufficient, with either one of the tubes 30 or 24 inflated and the other tube deflated, to float the joining means 34 and both of the tube means 20 and 22, tube means 20 being shown in inflated condition for floating the boom.

Tube means 20 and 22 further include separate weight means *or bouyancy reducing means* 36 and 38 which are free within respective tubes 24 and 30 to fall into the lower inside portion 40 and 42 of respective tubes 24 and 30. As shown, weight means 36 provides ballast for the inflated tube with weight means 38 causing the deflated tube 30 to assume a vertical position extending downwardly into the liquid 16 while tube 24 floats adjacent the surface.

When a leak occurs in inflated tube 24 and it becomes deflated, tube 30 may be gas inflated through means 28 with the weight means 38 then falling to the then lower inside portion 44 and weight means 36 falling into its then lower inside portion 46. The entire boom 10 becomes inverted with tube 30 inflated thus functioning in the manner previously described in connection with tube 24, and the now deflated tube 24 then functioning in the manner described in connection with tube 30.

Each of the weight means *or bouyancy reducing means* 36 and 38 includes a hollow elongated member 50 having a small diameter relative to the diameters of tubes 24 and 30 when inflated, and particulate solids 52, such as sand or the like, having a specific gravity greater than liquid 16, generally filling the hollow of member 50.

Figure 2:
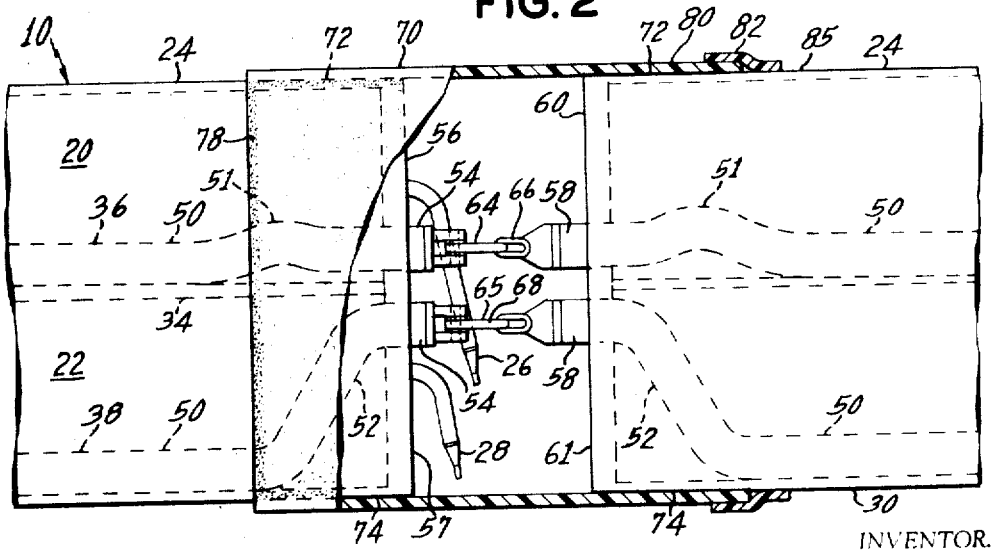
FIG. 2 is a side elevational view partly broken away and in section of the manner of connecting the ends of the float boom.

Referring now more particularly to FIG. 2 the manner of connecting the ends of the float boom is illustrated, it being understood that the description is equally applicable to connecting the adjacent ends of two float booms 10 together. Elongated members 50 have end portions 54 which project outwardly from the wall ends 56 and 57 of respective tubes 24 and 30 with the opposite end portions 58 extending respectively through the opposite wall ends 60 and 61 of respective tubes 24 and 30. The member end portion 54 and 58 of tubes 50 are gas sealed to the respective wall ends, so that tubes 24 and 30 may be selectively inflated and deflated through valve means 26 and 28 which are likewise connected to wall end 56 and 57 in gas tight relation. Gas means 26 and 28 may be connected to a compressed gas inflating device, such as the well known $CO_2$ bottle or to an air compressor through appropriate lines. Releasable attaching means 64 and 65, including eye connectors 66 attached to end portions 58 and spring loaded hook connectors 68 attached to end portion 54, are operative to connect end portions 54 to end portions 58 of members 50. The slight hump or slack 51 shown in member 50 is illustrative of the slight excess of the member in the straightened condition within the inflated tube as compared with portion 52 of member 50 in the deflated tube due to the designing of the boom so that members 50 extend outwardly through the ends adjacent joining means 34 located generally centrally between the tubes 24 and 30.

A sleeve 70, impermeable by the floatable material, telescopically receives therein and bridges between the end portions 72 and 74 of each of the tubes 24 and 30, as well as receiving the joining means 36 therewithin. Sleeve 70 may be sealed, as by heat sealing, to the tubes adjacent wall ends 56 and 57, as indicated by numeral 78.

After the connecting means 64 and 65 connect the ends 54 and 58 of members 50, tube 24 may be inflated through means 26 by a source of compressed air or the like, and thereafter the free end 80 of sleeve 70 may be sealed as by tape 82 to the tubes adjacent ends 60 and 61. It is to be understood that a zipper-like connection could be provided between sleeve 80 and the adjacent tube portion 85, if desired, rather than employing the tape 82 without departing from the intended scope of this invention.

The tubes 24 and 30 and joining means 34 are preferably of a flexible, water impermeable and gas retaining material such as plastic, rubber, nylon or the like. Sleeve 70 is also preferably a flexible material, such as rubber, so as to permit the sleeve to generally conform to the shape of the inflated and deflated conditions of each of the tubes.

Figure 3:
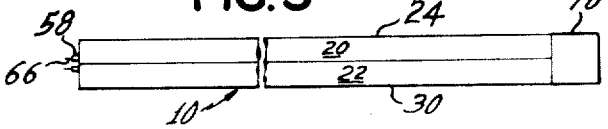
FIG. 3 is a side elevational view of the float boom on a reduced scale.

FIG. 3 depicts the float boom 10 in side elevation, it being understood that the length of the float boom may be any reasonable length, such as 50 or 100 feet, and that the the diameter of the tube when inflated may be from about 8 inches to 3 or 4 feet depending on the anticipated location of the float boom in use.

FIG. 4 depicts a plurality of float booms 10 connected end to end to form a complete ring 90 which permits the floatable material to enter through the open bottom and to be confined therewithin, in a manner well known in the art. It is to be understood that the float boom 10 may be used with its ends connected to the sides of a ship or the like to capture escaping floatable material therefrom or in the manner illustrated in FIG. 4.

While only a certain preferred embodiment of this invention has been shown and described by way of illustration, many modifications within the true spirit and scope of this invention and within the following claims will occur to those skilled in the art.

What is claimed as new and what it is desired to secure by Letters Patent of the United States is:

1. In a float boom for confining material floatable on a liquid surface, the combination of first tube means comprising a first hollow collapsible elongated tube, means for selectively gas inflating and deflating said first tube, second tube means comprising a second hollow collapsible elongated tube disposed alongside of said first tube, joining means impermeable by the floatable material for externally connecting said tubes along the lengths thereof, and separate means for selectively gas inflating and deflating said second tube separately from said first tube, the specific gravity of said first tube means and of said second tube means being greater than that of said liquid, whereby when the tube of either tube means is deflated that tube means sinks, the gas capacity of each tube alone being sufficient when either one of said tubes is inflated and the other deflated to float said joining means and both of said tube means.

2. In the float boom as defined in claim 1 wherein each said tube means further comprises weight means free within respective said tube to fall into the lower inside portion thereof.

3. In the float boom as defined in claim 2 wherein each said weight means comprises a hollow member having a small diameter relative to the diameter of said tubes when inflated and particulate solids having a specific gravity greater than the liquid generally filling said member.

4. In the float boom as defined in claim 1 wherein said joining means and both of said tube means constituting a floatable material barrier having ends, an elongated member connected to and extending along said barrier and having end portions projecting from said barrier ends, and releasable means attached to said end portions for connecting same.

5. In the float boom as defined in claim 4 wherein said elongated member is hollow and has a small diameter relative to the diameters of said tubes when inflated, further comprising particulate solids having a specific gravity greater than the liquid generally filling the hollow of said member.

6. In the float boom as defined in claim 1 further comprising an elongated member connected to and extending along and within each said tube and having end portions projecting from the ends of each of said tubes, and means attached to each said member end portions for connecting said end portions of respective said member together.

7. In the float boom as defined in claim 6 wherein each said elongated member is hollow and has a small diameter relative to the diameters of said tubes when inflated, further comprising particulate solids having a specific gravity greater than the liquid generally filling the hollow of each said member.

8. In the float boom as defined in claim 1 further comprising connecting means impermeable by the floatable material for bridging between the end portions of respective said tubes and said joining means whereby floatable material is substantially inhibited from flowing from the confined area within the boom outwardly through and between said tubes and joining means end portions.

9. In the float boom as defined in claim 4 further comprising a sleeve impermeable by the floatable material for telescopingly receiving therein and bridging between the end portions of respective said tubes and joining means, said releasable means when operative to attach said member end portions further surrounding said releasable means, and said member end portions.

10. In the float boom as defined in claim 1 wherein said tubes when inflated and said joining means have a cross-sectional configuration of an 8.

*11. In a float boom for confining material floatable on a liquid surface, the combination of first tube means comprising a first hollow collapsible elongated tube, means for selectively gas inflating and deflating said first tube, second tube means comprising a second hollow collapsible elongated tube disposed alongside of said first tube, joining means impermeable by the floatable material for externally connecting said tubes along the lengths thereof, and separate means for selectively gas inflating and deflating said second tube separately from said first tube, bouyancy reducing means associated with one of said tubes for disposing at least a part of said one tube below the liquid surface, the gas capacity of each tube alone being sufficient when either one of said tubes is inflated and the other deflated to float said joining means and both of said tube means.*

*12. In the float boom as defined in claim 11 further comprising connecting means impermeable by the floatable material for bridging between the end portions of respective said tubes and said joining means whereby floatable material is substantially inhibited from flowing from the confined area within the boom outwardly through and between said tubes and joining means end portions.*

*13. In the float boom as defined in claim 11 wherein said tubes when inflated and said joining means have a cross-sectional configuration of an 8.*

*14. In the float boom as defined in claim 11 wherein said joining means includes an elongated member extending along and attached to one of said tube means.*

*15. In the float boom as defined in claim 14 wherein said joining means includes means attached to each end portion of said elongated member for connecting said end portions together or adapted for connection to another end portion means of another adjacent float boom.*

*16. In the float boom as defined in claim 11 wherein said bouyancy reducing means is disposed in either one of said tubes with the other tube inflated for disposing at least part of said one tube below the liquid surface.*

*17. In the float boom as defined in claim 16 wherein said bouyancy reducing means in either one of said tubes includes weight means free within respective said tube to fall into the lower inside portion thereof.*

References Cited

The following references, cited by the Examiner, are of record in the patented file of this patent or the original patent.

UNITED STATES PATENTS

| | | | |
|---|---|---|---|
| 3,428,978 | 2/1969 | Johnson | 65—1 F |
| 2,682,151 | 6/1954 | Simpson et al. | 61—1 F |
| 2,185,458 | 1/1940 | Giliasso | 61—5 |
| 2,240,567 | 5/1941 | Meacham | 61—1 |
| 2,968,928 | 1/1961 | Wicklander | 61—1 |
| 3,146,598 | 9/1964 | Smith | 61—1 |
| 3,321,923 | 5/1967 | Smith et al. | 61—1 |
| 3,369,664 | 2/1968 | Dahan | 61—1 X |
| 3,494,132 | 2/1970 | Logan | 61—1 F |

PETER M. CAUN, Primary Examiner